Oct. 5, 1943.  A. J. DORÉ  2,331,016
CLUTCH
Filed Feb. 5, 1942

INVENTOR
ARTHUR J. DORÉ

ATTORNEY

Patented Oct. 5, 1943

2,331,016

UNITED STATES PATENT OFFICE 2,331,016

CLUTCH

Arthur J. Doré, Chicago, Ill., assignor to Teletype Corporation, Chicago, Ill., a corporation of Delaware Application February 5, 1942, Serial No. 429,637

7 Claims. (Cl. 178—53.1)

The present invention relates to motion communicating instrumentalities and more particularly to mechanical clutch apparatus for communicating rotary motion intermittently to a driven apparatus.

In the operation of start-stop telegraph receiving mechanisms, a driving shaft continuously rotating at accurately regulated speed and a driven shaft periodically connected to the driving shaft through the medium of an instantaneously responsive clutching mechanism are provided. In order that the driven apparatus may be maintained in synchronous phase relationship with incoming line signals, it is essential that the movement thereof be initiated coincident with the reception of a start impulse which is the first of a series of impulses constituting a start-stop permutation code signal. Thus, the accuracy of signal transmission is critically dependent upon consistent or regular responsiveness on the part of the clutch medium for connecting the constantly rotating drive shaft with the intermittently rotatable driven shaft for thereby maintaining phase and synchronism and for preventing false signal responses which would ensue in the event that this clutching medium varied in respect to the period of time occupied from the moment of release to the instant of full coupling engagement.

Clutching between a constantly driven shaft and a periodically driven shaft has principally been effected heretofore through the utilization of friction clutching apparatus; that is, driving couplings in which the driving contact element is associated with a driven contact element through the medium of fibrous or other frictional spring tensioned disc coupling. The tension in clutches of this type may be adjustable so as to effect driving engagement up to a certain point of resistance beyond which the driven element may be held against the efforts of the driving force and a controlled degree of driving torque is thus permitted. One of the effects of this type of clutch has been to induce local heating due to the frictional engagement between the elements of the clutch during the arrested condition of the driven portion. Then, too, where the friction clutch members are subjected to greater spring tension an increased load is placed upon the driving motor during idle or clutch slipping time requiring the use of large and more costly motors in order to withstand the strain of overcoming friction due to the clutch tension.

As a result of heating, the clutch elements of this type of apparatus will be caused to expand beyond their normal dimensions and to induce additional wear between the slip members of the clutch so that notwithstanding critical adjustments that may have been established during the normal relationship of the elements, this wear results in greater slippage exceeding that contemplated when making the adjustments. In order to minimize these wearing effects, the size of friction clutch elements are usually made larger than the dimensions of corresponding positive clutch elements, thereby enlarging the area of wear or friction-engaging surfaces and also overcoming, to a certain extent the delayed pick-up of the driven members due to their own inertia.

Another inherent drawback of the friction clutching apparatus is that the motor load during idle time is high, compared to the maximum useful load. This necessitates a large motor and low power efficiency. The use of a positive tooth clutch, however, introduces a different element of difficulty because the size of the engaging elements between the driving and driven portions of the clutch must be large enough to carry the shock loads imposed on them in order to have sufficient strength to withstand the strain under which clutches of this type are operated. This difficulty, resulting from the size of these elements, is that the variation in the time required for engagement of the clutch is appreciable, being approximately equal to the time for the driving member to advance one step. On the other hand, when the teeth are reduced in size to minimize the angle between consecutive points of engagement between the elements of the clutch, then the teeth may be of insufficient size to withstand the strain and wear incident to the operating conditions under which clutches of this type are expected to perform.

Accordingly, the principal object of the present invention is to provide a positive clutch mechanism adaptable for use with printing telegraph apparatus having a considerably greater number of radial positions of engagement than the number of engagement elements provided by one of the clutch coupling members and having means to definitely locate the starting position.

In order to overcome the difficulties previously mentioned, there is proposed herewith a principle of clutch design availing of the strength advantages of relatively large teeth elements in the driving or driven members of a clutch assembly, but utilizing a plurality of engagement teeth in the other of the driving or driven elements having a relative staggered relationship so that the engagement of any one of them at almost any instance may be effected, notwithstanding the correspondingly large dimensions of the teeth. Since these latter elements are staggered one from the other, the intervening distances in which driving union can be had is considerably smaller than the distance between consecutive teeth.

In accordance with a preferred contemplation of the present invention, the driving element of the clutch is comprised of a ratchet wheel of sufficient width to accommodate transversely a plurality of pawls which are carried on a common pivot integrally associated with the driven element of the clutch. Individually acting springs urge each pawl into engagement with the periphery of the ratchet wheel, and while the teeth of said ratchet wheel are of substantial size and cut parallel to the axis of rotation, the engagement shoulders of the several pawls are of corresponding size and staggered or offset one from the other in a progressive sequence with the overall difference between the shoulders of the first pawl and that of the most remote pawl therefrom equal in distance to somewhat less than the length of a tooth on the ratchet wheel. Abutment lugs integrally associated with the pawls are formed so as to be in transverse alignment with each other, and during the course of rotation of the assembly, these lugs encounter a zero position whereat they may be engaged by a stop gate which is rigid or unyielding during marking or with-current conditions of the line magnet but which is mildly spring-urged and readily yieldable to the force of the several abutment lugs during spacing or no-current conditions of the line.

In this way there is obtained a greater number of radial positions at which the driving and driven portions of the clutch apparatus may engage than has heretofore been possible under conditions of positive tooth clutch apparatus adaptable to telegraphic instrument operation. Also, there is provided a latch for definitely locating the driven portion of the clutch assembly in its arrested or zero position and preventing reverse rotation following the disunion of the clutch elements, in order to avoid an oscillating condition between engagement and disengagement which would result in a variable start position.

For a more comprehensive understanding of this invention reference may be had to the accompanying drawing and to the detailed specification following hereinafter, in which like reference characters designate corresponding parts throughout and in which;

Fig. 1 is a plan view of a portion of a selector mechanism of a type now well-known in the art of printing telegraph apparatus and particularly illustrated in U. S. Patent No. 1,745,633, issued February 4, 1930 to S. Morton et al.;

Figures 1, 2, 3, 4, 5:
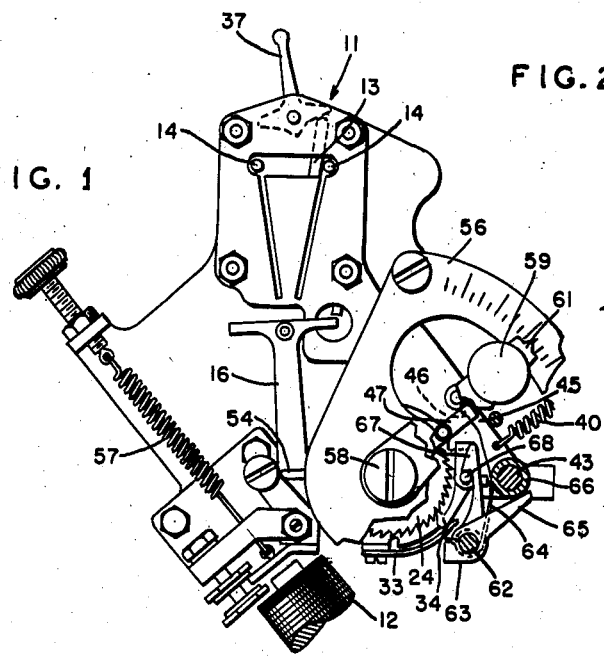
Fig. 2 is an exploded perspective view of a positive tooth and ratchet clutch engagement apparatus having embodied therein features of the present invention.
Fig. 3 is a side elevation of a clutch mechanism and distributor cam assembly after the manner of Fig. 2.
Fig. 4 is a fragmentary side elevation of the apparatus featured in Fig. 3.
Fig. 5 is an enlarged detail view of the ratchet wheel and multiple-pawl coupling elements featured in the embodiment of Figs. 2 and 4.

In Fig. 1 of the accompanying drawing, the reference character 11 designates generally a sword and T-lever assembly unit which functions to interpret the incoming code combination signal impulses that are received by the single electromagnet 12 into corresponding movements of a set of code bar selector members, such as those designated 38 in the referred to U. S. Patent No. 1,745,633. The points of connection between unit 11 and the code bars 38 are represented by the T-lever extremities 37 (so designated in the referred to patent).

The T-levers 37, of which there may be five or six depending upon the fundamental permutation code employed in the particular apparatus, are positioned by a set of swords, of which a foremost one 13 is visible in Fig. 1 in one of two alternative positions, the other position being opposite from that shown and in contactual engagement with the left side stop pin 14.

The set of swords 13 is held by a corresponding set of levers (not shown) each one of which is actuated by an individual cam projection on the cam assembly sleeve 15. It is to be understood that the conventional arrangement of cam projections on assembly 15 and the number of such projections is dependent upon the particular practice and the nature of the apparatus to be supervised.

The set of swords 13 is positioned when each is successively brought into engagement with an armature lever 16, and this operation is performed cyclically when the cam assembly 15 is released for rotation.

Normally, however, when no signals are being received, cam assembly 15 is maintained dormant and in a zero position because its arm 17, which is carried in a slot 26 of ring 25, encounters an obstruction element which, in the instant embodiment, is involved in the operation of an improved clutch apparatus now to be described.

It is to be noted that shaft 18 is continuously rotatable in a clockwise direction, as observed in Fig. 2, and that this shaft corresponds with the one designated 21 in the S. Morton et al. patent referred to above, which is driven by a motor through a drive pinion therein designated 23. Integrally associated with said shaft 18 is a threaded head flange 19 having a reduced portion 21, slotted as at 22, and screw threaded as at 23 for interlocking association therewith of the ratchet wheel 24. Journaled freely upon the reduced portion 21 and nested between the flange 19 and the adjacent surface of ratchet wheel 24 is a ring 25 with which is integrally formed the saddle projection 26 that receives the vertical portion 17 of the cam assembly arm 27, a yoke formation 28, which, together with the projection 26, affords bearing openings 29 for a pivot screw 31, and a lug formation 32 that affords an anchorage to a multiple-leaved tension spring 33.

Ratchet wheel 24 is a relatively wide member and its teeth are shaped to engage abuttingly, when the wheel is rotated in a clockwise direction, the teeth of a set of pawls 34, 35, 36, and 38. Each of the aforedescribed pawls is pivoted upon the journal screw 31, described above, so as to be rotatable upon an axis parallel to the driving shaft 18 and each is tensioned in a clockwise direction by one of the levers of spring 33. However, the engaging teeth of said pawls 34, 35, etc., which are as large as those of ratchet wheel 24, are of different radial distances from said axis of rotation with the topmost pawl 34 illustrated as having the shortest radius, and the lowermost pawl 38, the longest. By observing the comparison illustrated in Fig. 5, it will be noted that the difference in length of the several pawls as thus explained, does not exceed the angular distance between consecutive teeth of ratchet wheel 24. Accordingly, when driving engagement is effected between any one of the teeth of ratchet wheel 24 and one of the pawls 34, 35, etc., this connection is had to the exclusion of engagement between any of the other teeth of said ratchet wheel and any of the other pawls 34, 35, etc. Also, but one pawl, 34, 35, etc. may at any time engage any one of the teeth of ratchet wheel 24 to the exclusion of the others. Through this arrangement of coupling members, the size of the teeth of ratchet wheel 24, as well as those of the pawls 34, 35, etc., may be maintained comparatively large, whereas the number of angular positions at which engagement may be effected between any one of the pawls and said wheel 24 is the same as that obtained by the use of a single pawl where the size of the teeth in ratchet wheel 24 is but one-fourth (in the instant example) of the size of those on said wheel 24.

Thus, there is obtained a comparatively stronger coupling engagement, due to the larger dimensions of the engagement elements while yet availing of a greater number of angular engagement positions. Each one of the pawls 34, 35, etc. is provided with a radially-extending lug 39, Fig. 2, and these several lugs are disposed in vertical alignment with each other and in horizontal alignment with a blocking shoulder 41 of a stop gate member 42 which is pivoted upon a shoulder screw 43 carried by an orientation plate 44.

Stop gate 42 is normally urged by a spring 40 to assume an extreme clockwise position, as viewed in Figs. 1 and 2, so that its stop lug 41 obstructs the passage of the pawl projections 39, but it is to be understood that the force of spring 40 is insufficient to overcome that of any of the several tension leaves of spring 33 acting upon the several pawls 34, 35, etc. Consequently, spring 40 alone is unable to hold stop gate 42 in the designated position. A latch arm 45 integrally formed with gate 42 and extending at an angle therefrom, see Fig. 1, affords a right-angle shoulder that engages a corresponding shoulder 46 formed in a bell crank lever 47, Fig. 2, which is pivoted at 48 in a slotted supporting block 49.

An opposite arm 51 of lever 47 is engageable by one arm 52 of a bell crank lever whose other arm 53 is disposed vertically, Figs. 2 and 3, and is engaged by a horizontal thrust pin 54. Pin 54 is slidably supported and bell crank 52—53 is pivotally supported within a mounting block 55 carried upon a stationary face plate 56 which is identified with the orientation adjustment mechanism more particularly concerned in the S. Morton et al. patent referred to above.

For an understanding of its application to the instant invention it will suffice to know that horizontally movable pin 54 is thrust rightwardly, Figs. 1 and 3, during the relaxation of armature lever 16 and in response to the restoration influence spring 57. Also, it is of interest that arm 52 of bell crank 52—53 terminates with a circular lobe and tha the point of contact between this lobe and arm 51 of lever 47 coincides with the axial center of shaft 18 and the assembled elements featured in Fig. 2. Accordingly, upon the rightward movement of pin 54, bell crank 52—53 is rotated clockwise about its pivot, lever 47 is rotated counterclockwise about its pivot 48, and thereby shoulder 46 is withdrawn from the path of oblique arm 45.

Also, block 55, which has been described as carried by the stationary plate 56, and block 49 as carried by the orientation plate 44, are movable relatively to each other without affecting the relationship of the several moving parts just described because their mutual point of contact is at the axial center of the rotation of plate 44, which also coincides with the afore-described axial center of shaft 18 and the contact point between the lobe of arm 52 and arm 51 of lever 47. Since, therefore, the relaxation of armature 16 is identified with spacing (no-current) impulses, and its energization with marking (current) impulses, it will be understood that the freeing of stop gate 42 by the withdrawal of shoulder 46 is correspondingly identifiable with marking and spacing impulses. That is, during idle and other marking conditions, stop gate 42 will be rigid and will, when it encounters the projections 39, withdraw pawls 34, 35, etc. and effect a disunion between the driving clutch element 24 and the driven clutch elements 34, 35, etc., while coincident with spacing impulses, stop gate 42 will yield to the projections 39 and will itself rotate about pivot screw 43 until the projections 39 have passed.

The movement of orientation plate 44 about its pivotal screw 58 may be manually regulated by the loosening of a knurled thumb bolt 59 which serves as a means for binding said plate 44 in any of its set positions by clamping the rigid mounting plate 56 between said plate 44 and an index arm 61, see also Figs. 1, 3, and 4. Upon another pivot screw 62, carried by orientation plate 44, is supported a bell crank lever 63 which is urged by a torsion spring 64 in a counterclockwise direction, as viewed in Fig. 1, until its stop arm 65 encounters the spacing collar 66, carried upon shoulder screw 43.

When bell crank 63 is in this position, its opposite arm 67, which is provided with a latching shoulder, is disposed so as to encounter with said latching shoulder a pin extremity 68 that forms the upper terminus of pivot screw 31 that carries the several pawls 34, 35, etc. By means of this arrangement, as may be seen in Fig. 1, so long as ratchet wheel 24 is rotating clockwise and carrying with it the driven assembly, including pawls 34, 35, etc., and ring 25, the extremity 68 of screw 31 will successively engage the cammed leading surface of arm 67 rotating bell crank 63 clockwise about its pivot 62, passing beyond the bell crank and continuing on its course without being affected thereby. However, when line magnet 12 is found in its marking position, coincident with the stop impulse of each permutation code signal and stop gate 42 is rendered rigid, so as to obstruct pawls 34, 35, etc. and effect a disconnection thereof from the driving ratchet wheel 24, the driven portion of the clutch, comprising the pawls 34, 35, etc. and their pivot screw 31, will be arrested in the positions indicated in Fig. 1 and will be held thereat against reverse rotation; that is, in a counterclockwise direction when the pin extremity 68 encounters the shoulder of arm 67.

Without this precaution, the driven assembly aforedescribed, including also the cam sleeve 15, would rotate in a counterclockwise direction, due to the pressure of the multi-leaved spring 33 against pawls 34, 35, etc. and the lever action of the latter upon pin 68 and disc 25, until a pawl 34, 35, etc. engages a tooth of ratchet wheel 24 which then again rotates the driven members clockwise until the pawls are disengaged. This cycle would recur continuously until a spacing (no-current) impulse released stop gate 42. Since the next spacing (no-current) impulse can occur at any time, the position of the driven members at the starting instant may be at any point within this cycle, thus introducing a further variable factor and cause of error in phasing. Under such circumstances, the driven element of the clutch would float or creep counterclockwise to some position other than the zero position.

While the present invention has been explained and described in contemplation of a specific embodiment, it is to be understood, nevertheless, that numerous modifications and variations might be incorporated without departing from the essential spirit or scope thereof. Accordingly, it is not intended to be limited by the particular language of the foregoing detailed specification nor by the showing of the accompanying illustrations, except as indicated in the hereunto appended claims.

What is claimed is:

1. In a permutation code apparatus, a continuously rotatable shaft, an intermittently rotatable shaft having a plurality of impulse distributing elements, each related to an element of a permutation code, and means for effecting driving connection between said shafts comprising a toothed member associated with said continuously rotatable shaft, a series of variable length connector elements individually engageable by said member and pivotally associated with said intermittently rotatable shaft and having disengagement lugs disposed in transverse alignment with each other, means for urging each of said elements into engagement with said member, and a device for interrupting the connection between said member and any of said elements in a zero position comprising electromagnetically supervised apparatus having concurrent engagement with said integral lugs of said plurality of variable length connector elements.

2. In a printing telegraph apparatus, a continuously rotatable shaft, a permutation code distributing member, and positive clutch means for effecting engagement between said continuously rotatable shaft and said member, comprising a clutch driving element having a plurality of peripheral teeth in concentric balance and associated with said continuously rotatable shaft, a clutch driven element having a plurality of engagement members of varying positions of engagement with the periphery of said clutch driving member and stop gate engagement portions in transverse alignment, and a stop gate having concurrent engagement with said stop gate engagement portions of all of said elements simultaneously under the supervision of incoming line signals.

3. In a printing telegraph apparatus, a continuously rotatable drive shaft, an intermittently rotatable distributing shaft, and positive clutch means for effecting engagement between said drive shaft and said distributing shaft, comprising a concentrically balanced driving element having a plurality of regularly spaced teeth carried by said continuously rotatable drive shaft, a concentrically unbalanced driven element comprising a set of pawls having a plurality of engagement members spaced in closer relationship than the distance between consecutive ones of said driving element teeth and engagement lugs in longitudinal alignment, and a stop device having concurrent engagement with said engagement lugs of all of said engagement members.

4. In a start-stop telegraph receiver, a selector, a set of selector setting members, an assembly of cam projections corresponding in number to that of said setting members, means for rotating said assembly of projections at a speed commensurate with incoming telegraph signals so that each projection thereof relates to an associated one of said set of members coincident with a line signal impulse, a clutch for releasing said rotating means comprising a concentrically balanced and continuously rotatable multiple-toothed driving member and a concentrically unbalanced driven member having a series of pawls disposed at incremental distances so as to be individually associated with and to engage the teeth of said driving member to impart rotative movement to the said driven member, and a control member for concurrently engaging said pawls and for thereby disassociating said driving and driven members of said clutch, said control member having an adjustable zero position in order to vary the relationship between said assembly of cam projections and said set of setting members.

5. In a single revolution clutch apparatus, a concentrically balanced driving member having a plurality of regularly spaced and radially disposed teeth, a driven member having a set of concentrically unbalanced pawls with portions for engaging said driving member teeth and disposed at positions which are incremental divisions of the distance between said teeth, a control device operative to withhold and release said pawls in unison, and means to orient the angular position of said control device to thereby establish the starting point of engagement between said driving and driven members within a margin corresponding to an increment of difference between the portions of said pawls.

6. A positive tooth clutch construction comprising a concentric driving member having coarse peripheral serrations, a driven member in axial alignment with said driving member, a set of coupling pawls carried eccentrically by said driven member, each pawl having an engagement tooth corresponding in proportion to said coarse peripheral serrations but offset from the teeth of the other of said set of pawls by an amount fractional to said serrations, and a control device disposed in the path of said set of coupling pawls during their rotation for simultaneously actuating them to disengage any one of them that may be effective to establish coupling engagement between said driving member and said driven member.

7. A clutch comprising a concentric driving coupler member having coarse peripheral serrations, a driven coupler member having a set of coupling pawls carried eccentrically, each pawl having an engagement element corresponding in proportion to said coarse peripheral serrations but offset from each other by an extent, fractional to said serrations, and a control device for simultaneously actuating said pawls to disengage any one of them that establishes coupling engagement between said driving member and said driven member.

ARTHUR J. DORÉ.